United States Patent
Grossman et al.

(10) Patent No.: US 6,335,737 B1
(45) Date of Patent: Jan. 1, 2002

(54) VIDEO DISPLAY AND SELECTION ON A GRAPHICAL INTERFACE

(75) Inventors: Bertrand M. Grossman, New York; Clifford Alan Pickover, Yorktown Heights, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/327,085

(22) Filed: Oct. 21, 1994

(51) Int. Cl.[7] .............................. G09G 5/00; H04N 7/16
(52) U.S. Cl. ...................... 345/719; 345/782; 345/848; 345/852; 345/972; 725/8
(58) Field of Search .................................. 395/155, 156, 395/159, 161, 63, 200.01; 345/2, 156, 700, 782, 848, 852, 719, 972

(56) References Cited

U.S. PATENT DOCUMENTS

| | | | | |
|---|---|---|---|---|
| 4,905,163 A | * | 2/1990 | Garber et al. ................. | 395/63 |
| 5,274,363 A | * | 12/1993 | Koved et al. ................... | 345/2 |
| 5,303,388 A | * | 4/1994 | Meitman et al. ............ | 395/159 |
| 5,381,158 A | * | 1/1995 | Takahara et al. ............ | 345/156 |
| 5,436,639 A | * | 7/1995 | Arai et al. ................... | 345/156 |
| 5,446,842 A | * | 8/1995 | Schaeffer et al. ...... | 395/200.01 |

OTHER PUBLICATIONS

Nye, Adrian, Xlib Programming Manual, vol. 1, 1990 pp. 1–7.
AIX Graphics Programming Concepts for IBM RISC System/6000, pp. 2–40 to 2–41, pp. 2–31, pp. 6–12, to 6–13, 5–1 to 5–2, 2–13 to 2–14.
Foley, J. and Van Dam, A., Fundamentals of Interactive Computer Graphics, 1980, pp. 560–561, 255–257, 267–280.

* cited by examiner

Primary Examiner—Hosain T. Alam
Assistant Examiner—Ella Colbert
(74) Attorney, Agent, or Firm—Louis J. Percello

(57) ABSTRACT

A graphical depiction of a carousel containing the icons or windows is provided for convenient presentation and manipulation on a screen of multiple windows, icons or TV broadcasts. These icons or windows are rotated into or out of view as the carousel rotates. Rotation can be controlled by mouse driven cursor, keyboard, application software, etc. Various identifying characteristics can be used to help users search through windows; for example, the title text of each window may be visible when the windows are in the carousel. Color can be an additional identifying characteristic. In instances where a large number of icons are used, this is a means for consolidating them. Multiple carousels can be used to consolidate different kinds of windows, icons, or TV broadcasts.

20 Claims, 4 Drawing Sheets

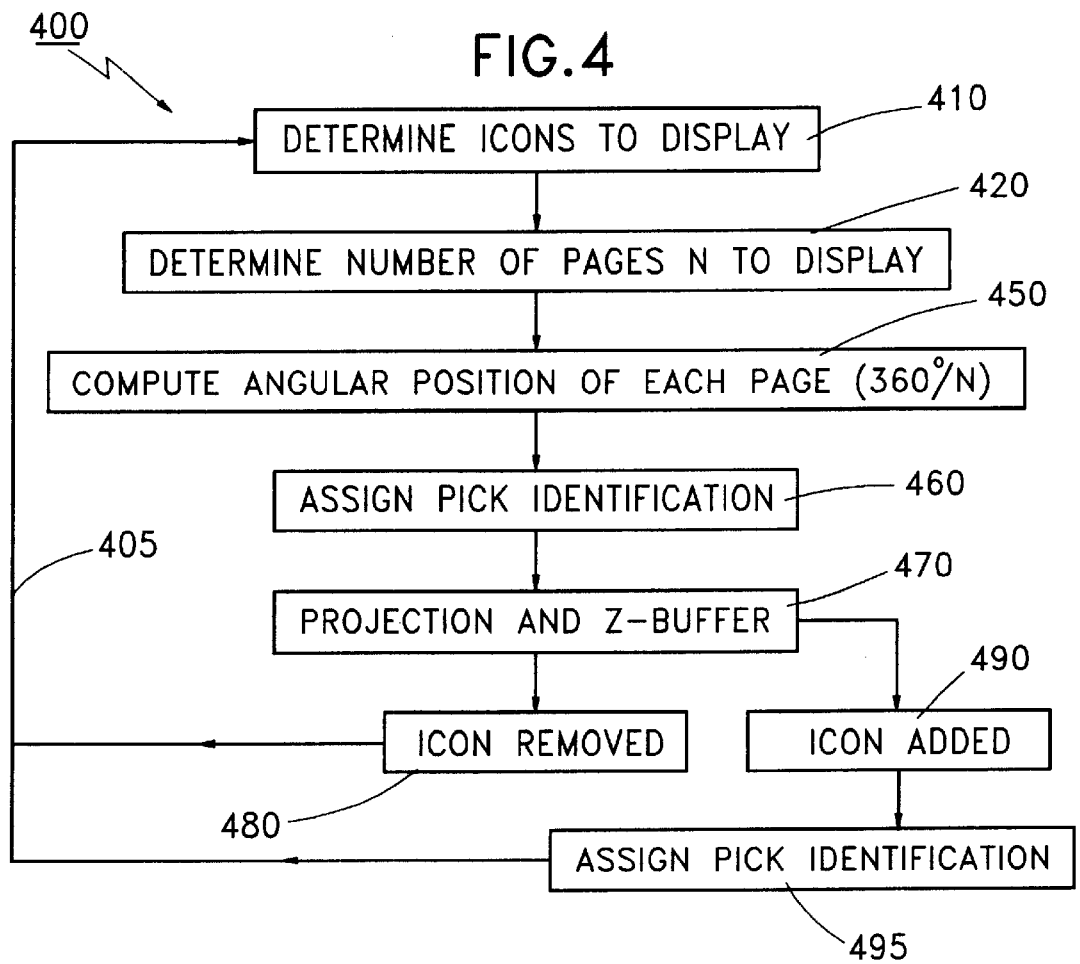
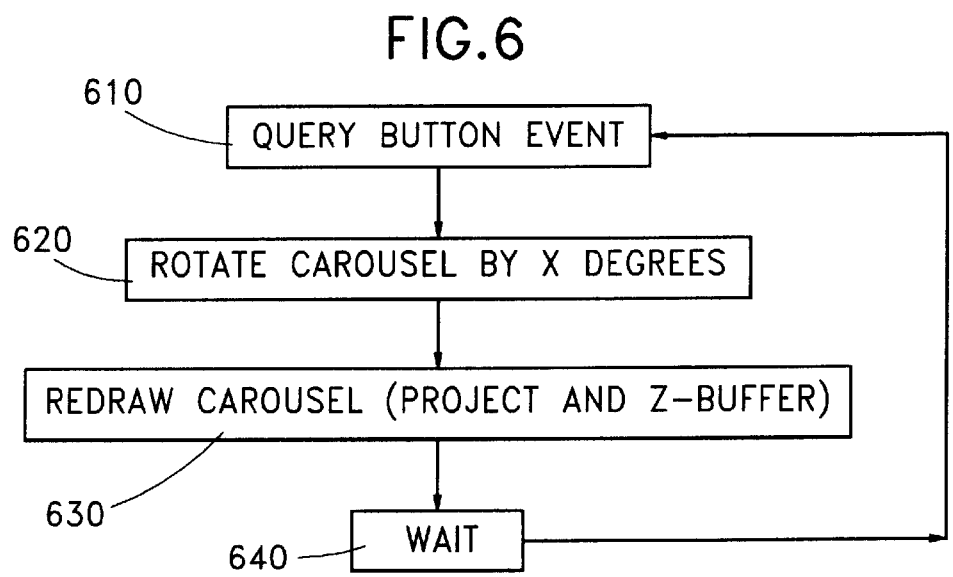

VIDEO DISPLAY AND SELECTION ON A GRAPHICAL INTERFACE

FIELD OF THE INVENTION

This invention relates to displays on graphical interfaces. More specifically, the invention relates to a selectable icons, or windows displayed on a graphical interface such as a computer monitor or television.

BACKGROUND OF THE INVENTION

Graphical user interfaces (GUIs) provide ways for users of computers and other devices to effectively communicate with the computer. In GUIs, available applications and data sets are often represented by icons which can be directly manipulated and selected by the user, rather than having to manually type a command to initiate a program. Icons are tiny on-screen symbols that simplify access to a program, command, or data file. Icons are usually activated by moving the mouse-controlled cursor onto the icon and pressing a button or key.

A computer window is a portion of the video display area dedicated to some specific purpose. Windows allow the user to treat the computer display like a desktop where various files can remain open simultaneously. The user can control the size, shape, and position of the windows. An active window is one in which a user has a current interaction.

In the field of television (TV), channel selection can be affected by selecting an icon consisting of the animated video broadcast on that channel frequency.

GUIs are often tedious and frustrating to use. Icons must be maintained in a logical manner. It is difficult to organize windows and icons when many are displayed at the same time on a single device.

OBJECTS OF THE INVENTION

An object of this invention is an improved system and method for organizing and managing video displays on graphical interfaces.

Another object of this invention is an improved system and method for organizing, displaying, managing, and selecting icons on a computer graphical interface.

Another object of this invention is an improved system and method for organizing, displaying, managing, and selecting windows on a computer graphical interface.

Another object of this invention is an improved system and method for organizing, displaying, managing, and selecting windows on a multiple channel television display.

SUMMARY OF THE INVENTION

This invention permits users to conveniently view and manipulate multiple windows, icons, or TV channel selections (appearing as a window on a TV screen monitor). These windows, icons, or TV channel selections appear as pages within a graphical depiction of a carousel. These pages appear to be rotating into or out of view as the carousel appears to revolve around an axis. Rotation can be controlled by mouse driven cursor, keyboard, application software, etc. Various identifying characteristics can be used to help users search through windows. For example, the title text of each window may be visible when the windows are in the carousel. Color can be an additional identifying characteristic. In instances where a large number of icons are used, this is a means for consolidating, managing and displaying them in an organized way. Multiple carousels can be used to consolidate different kinds of windows, icons, or TV broadcasts.

BRIEF DESCRIPTION OF THE DRAWINGS

FIG. 4 is a flow chart showing the steps required to load the carousel.

FIG. 6 is a flow chart showing the steps required to control a carousel via buttons.

DETAILED DESCRIPTION OF THE INVENTION

Figure 1:
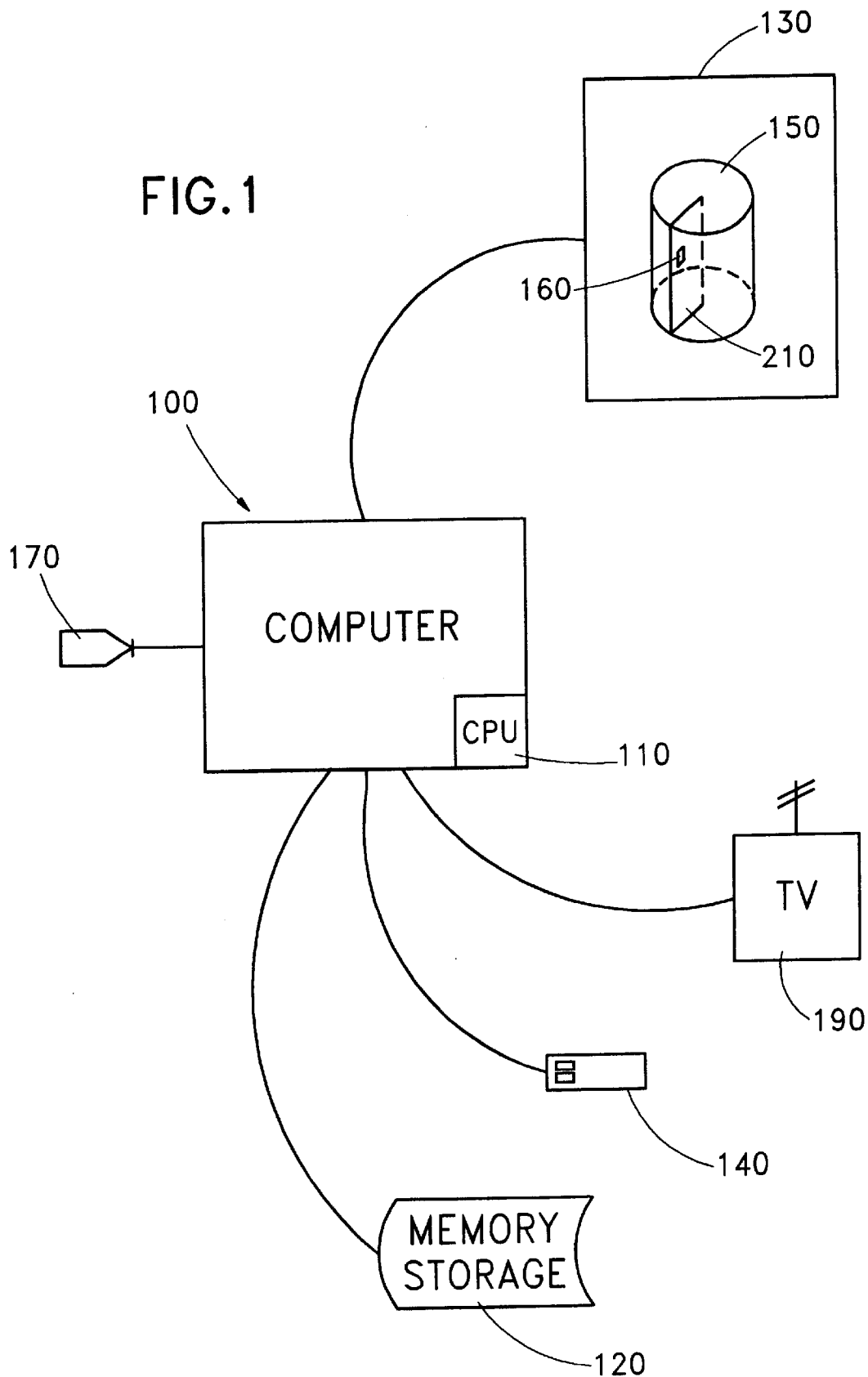
FIG. 1 is a block diagram of the hardware of one preferred embodiment of the present invention.

The present invention is capable of running on any general purpose computer system or microprocessor controlled television, preferably units which have the ability to present multimedia information to a user. One preferred embodiment is schematically represented in a block diagram in FIG. 1. A computer system 100 consisting of a control processing unit (CPU) 110, memory storage device 120, a display device or graphical interface 130, selection device such as a mouse 140, and a graphical representation of a carousel 150 which appears on the display device and contains windows or icons 160. The computer system 100 may also have audio output capability 170. In one embodiment, an IBM Personal System/2 (PS/2) Model 8595 Microchannel Floor Standing 486 System 100 consisting of a control processing unit (CPU) 110, memory storage device 120, a display device 130, selection device such as a mouse 140, and a graphical representation of a carousel 150 which appears on the display device and contains windows or icons. The mouse 140 may be used to select icons or windows 160 from the carousel. Systems 100 like this that can be used to display the novel carousel are w ell known. An IBM Personal System/2 (PS/2) ActionMediaII Display Adapter (described in the ActionMedia II Technical Reference) is used for audio/video playback 170/130. This adaptor may also be used to display TV broadcasts 190 and other full motion video and sound audio/visual displays.

Figure 2:
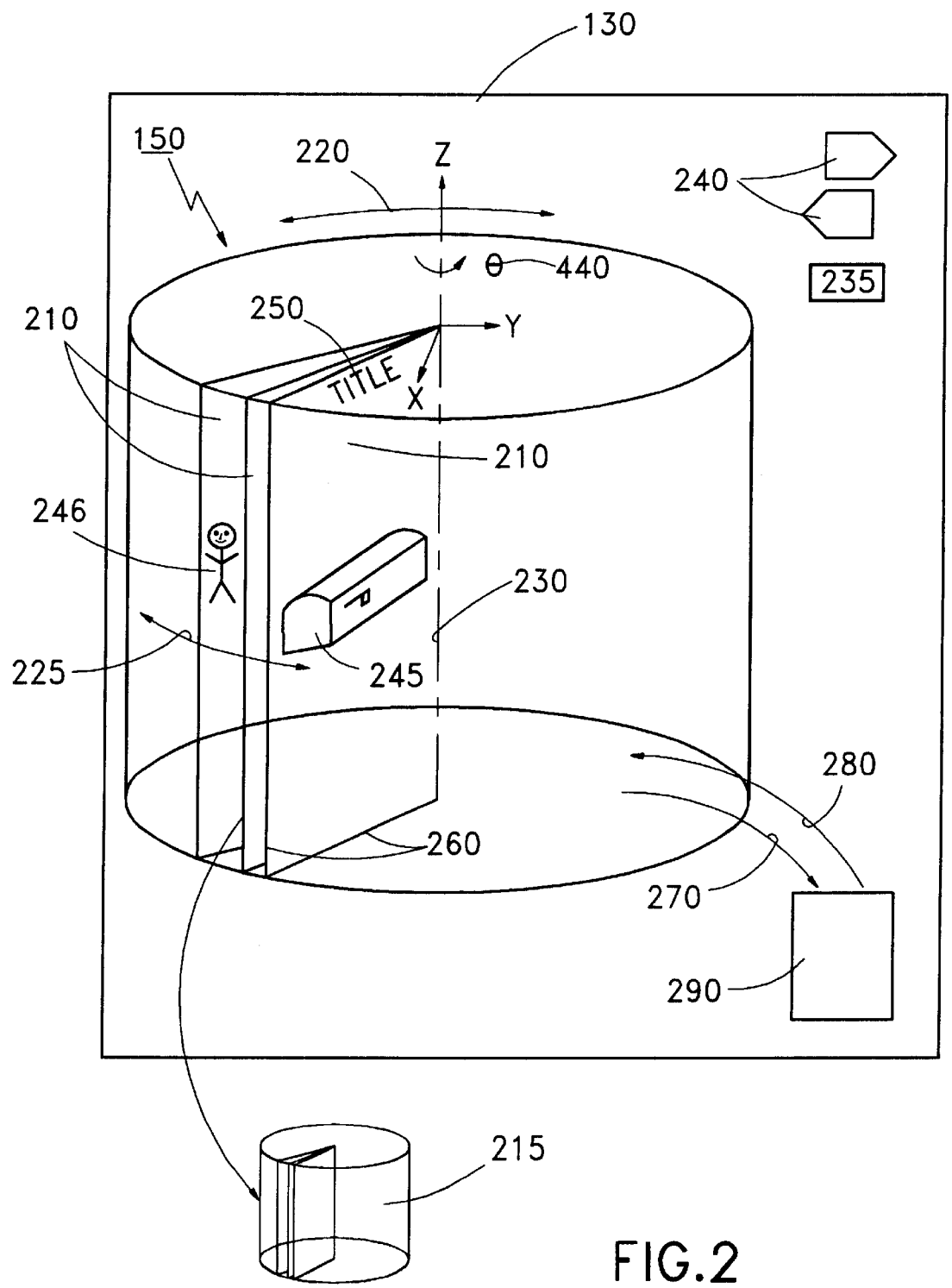
FIG. 2 is a drawing of an image of a carousel on a graphical interface.

FIG. 2 is a detail of the carousel 150 appearing on the display device 130. The carousel consists of pages 210 which may rotate 220 around an axis 230, which is one part of the page boundary. Each page 210 is a graphical representation of an icon or window such as a computer glyph 245 or TV image 246 or multimedia object 246. The rotation 220 of the carousel can be controlled using buttons 240 selected by the mouse 140 or any other pointing device. Alternatively, rotation may be controlled by dragging 225 the pages themselves using the mouse. Information 250, such as title text, identifying the page 210 may be visible at the top (or other location) of the pages.

A page 210 may show any visual feature including: glyphs 245, TV broadcast images 246, medical (X-ray, magnetic resonance imaging, etc.) images, family photos, catalog information, and pictures, text, multimedia (animated) images, pages from a book, phone book pages. These data may be loaded from a CD ROM. A page may be framed by a boundary 260. A page may be selected, as described below in greater detail, by pointing with a mouse. This action may initiate a function such as executing a program.

A page 210 may be removed 270 to a new area on screen 290. The page 290 may also be added 280 to the carousel. These operations are described later. The total number of pages in the carousel can also be display Id 235.

Figure 3:
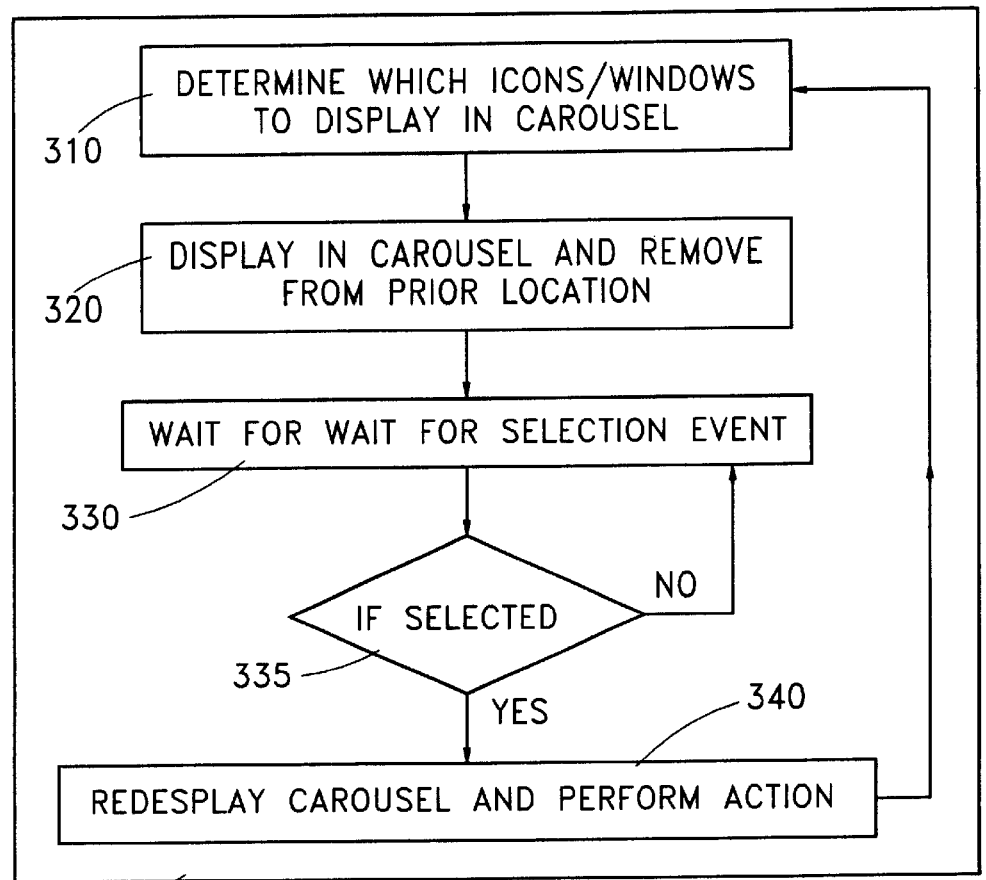
FIG. 3 is a flow chart showing the steps of one preferred algorithm of the present invention.

FIG. 3 is a flow chart showing the steps required for this invention. As a first step, carousel manager software 300 determines 310 which icons, windows, or TV channels to display 320 in the carousel. For example, a user profile on disk may designate which icons are to appear in the carousel. This file may be updated periodically by application software or the user. The process by which user profiles are queried leading to a display event is well known.

Once the carousel is displayed, it waits for events 330 such as a mouse selection. Once an event is detected 335, the carousel responds 340 by rotating its collection of screens or by losing or gaining windows. The events may also come from another program which directs the carousel to rotate 220, lose, or gain windows. The processes of graphical display and event handling is well known. For example, a particular action such as a double-click of the mouse 140 while pointing to a page in the carousel may cause the page 210 to leave the carousel and take a position 290 somewhere else on the display 130. This can be accomplished, for example, by having the carousel software make a request to the screen window manager (such as X-windows) to display the particular window. Similarly, a particular selection action (either by the user or a program) may cause an icon, window, or TV broadcast to leave the display and appear 280 in the carousel icon 150. Additionally, pages 210 may be dragged into or out of the carousel or across multiple carousels in a similar manner.

Graphical display 320 of pages is accomplished by using graphical principles. For example, three dimensional objects must be projected into two dimensions in such a way that human depth perception mechanism will properly resolve visual ambiguities. The projection of three dimensional models onto a screen may be handled by software, such as GL, which performs such operations by calling viewing transformation routines that map from world coordinates to eye coordinates. That is, they indicate the location of the eye, the direction in which it is looking, and use this information for displaying the model. The perspective, window, ortho, and loadmatrix subroutines perform the necessary transformations in GL. Such transformations and their implementation are well known to graphics specialists.

Given a three dimensional object and viewing specifications defining the type of projection, we determine which edges and surface of the object are visible so that only the visible edges and surfaces are displayed. Algorithms for removing hidden surfaces are well known. For example, z-buffer algorithm is executed in existing high-level graphical packages such as GL with the command zbuffer(TRUE).

Rotation of pages (or redisplay step 340) is accomplished by using graphical principles). Page rotation is accomplished using a a 4×4 rotation matrix. In high-level graphics packages, such as GL, rotation is accomplished with commands such as rotate(angle,'z'), where angle is the angle or rotation in degrees about the axis of the carousel. The motion of the pages resembles physical page rotation in a rotating file.

Page information need not be static but may consist of animated images. Animated objects on the display may be created using a technique called double buffering. For smooth motion, the system displays a completely drawn image for a certain time (for instance, 0.01 seconds), then presents the next frame completely drawn during the next time period, and so on. Double buffering makes this process fast. The system's standard bitplanes are divided into two halves, only one of which is displayed. Drawing is typically done into the other invisible half. When drawing is complete, the buffers are swapped. In the language GL this buffer swapping is performed using the swapbuffers( ) routine.

Each page may also have an associated audio portion which is played 170 when a page is selected (described below). The production of audio from a multimedia file or signal is well known to those skilled in the art.

FIG. 4 is a flow chart 400 showing additional details of the preferred embodiment of FIG. 3. When the carousel is initially loaded (FIG. 4), a preferred method for the software to determine 310 which icons to display 320 is by reading 410 a file on disk containing identifying numbers for each page to be displayed. As a default, the carousel software uses the number N of pages 420 to be displayed in order to orient the pages equally around the carousel. In step 450, the angular position θ (440 in FIG. 2) is therefore 360°/N. The Cartesian position of a page is therefore controlled by x=r cos θ and y=r sin θ, where θ=360/N. If this number should change as a result of adding or removing pages, the angular position is recomputed. Note that we need not attempt to fill the entire carousel, and that the number 360 may be replaced by 180 to squeeze all pages into half of the carousel. As described below, each page is assigned a "pick" identification 460. The carousel image is projected and hidden surfaces removed (via z-buffer) 470. If a page 210 is removed (270, 480) then the software again determines 405 which pages to display 410. If an icon is added (280, 490) a new pick identification is assigned 495 and then the software determines (405, 410) which icons to display.

Figure 5:
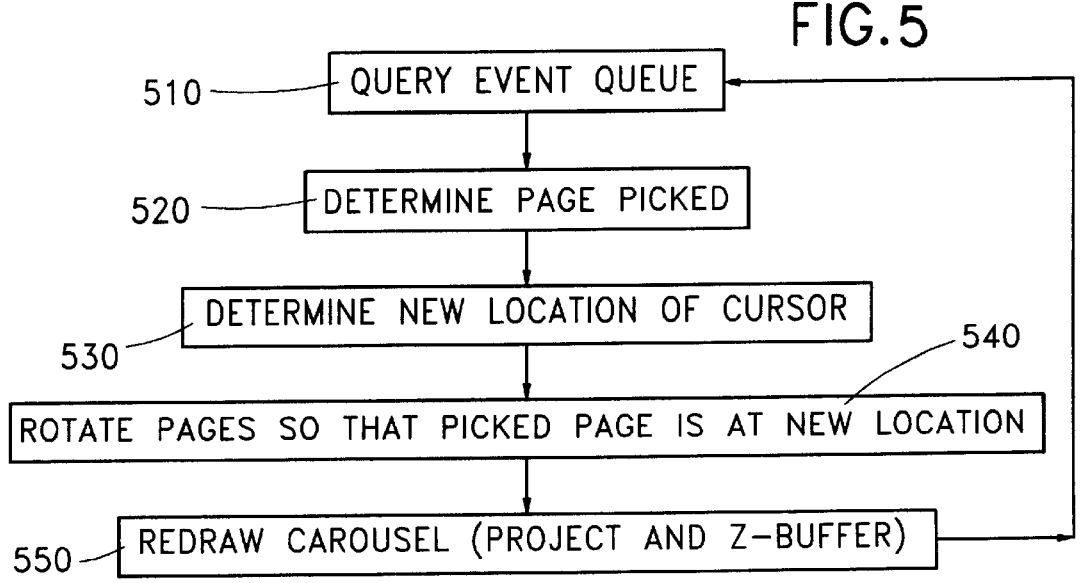
FIG. 5 is a flow chart showing the steps required to control a carousel by dragging with a cursor.

Dragging 225 of pages 210 with a mouse 140 allows the user to select any page and, for example, to move a page from the back of the carousel forward, so that it can be read more easily (FIG. 5). The graphical notions of "picking" and "selecting" are well known to graphics programmers. For example, the graphics language GL provides a mechanism called "picking" for returning information about where graphical primitives (such as the pages in the carousel) are being drawn. Picking returns all primitives that are currently being drawn in the vicinity of the cursor. That is, picking is used to identify the drawing primitive, such as a page, on the screen that appears near the cursor. When the system is in picking mode, it checks for "hits," whereby a hit occurs every time that a drawing primitive intersects the picking region. The picking region is a rectangular area of the screen, centered about the location of the cursor. By default, for example, it is 10×10 pixels in size. The system records hits by writing data into a picking buffer. The actual data that is recorded may be an identifying number associated with a page. The act of assigning such pick numbers is known to graphics programmers. For example, in GL it is done with the loadnamne(n) command, where n is an integer identifying the selectable item. The selection of a page may initiate a function such as executing a program. In the Unix operating system, this may be achieved by issuing a "system" call.

In a similar manner, FIG. 6 shows how graphical buttons may be queried. If a button is selected, the carousel pages rotate by a specified amount, for example 5 degrees, about its axis.

The carousel spends most of its time waiting for user events, such as dragging a page with a mouse, clicking on the page turner buttons, double-clicking on a page to remove it from the carousel, etc. Most input devices have an associated value. If the input device is a button, the value is either 1 (pressed) or 0 (not pressed). If the device is a valuator, such as the x position of the mouse, its value is an integer that indicates the position of the device. The carousel manager software 300 gets the value from input devices by queuing or polling 330. Polling immediately returns the value of a device which is a button or valuator. For example, in GL getbutton(LEFTMOUSE) returns 1 if the left button of the mouse is down, and returns 0 if it is up. Queuing uses an event queue to save changes in device values and other input events so the program can read them later. Devices that are queued act as asynchronous devices, independent of the user process. Whenever a device that is queued changes state an entry is made in the event queue. The handling of event queues is well known to graphics specialists. For example, in GL the "qdevice" subroutine queues the specified device (a keyboard key, mouse button, or valuator.) Each time the device change state, an entry is made in the event queue. The carousel manager waits for such information, and performs the required graphical changes as a result.

FIG. 5 shows how the carousel can be controlled by dragging 225 pages. The software first queries the event queue 510 to determine which page 210 is picked 520. The software then determines the new position of the cursor 530. The pages are all rotated 220 to their new positions 540. The carrousel is then redrawn 550.

FIG. 6 shows how the carousel can be controlled using buttons 240. Button events are queried 610. The carousel is rotated 220 by a preset number of degrees 620. The carousel is redrawn 630. The carousel then waits again for an event 640. The buttons 240 can be selector buttons on a television controller.

A particular event, such as a double-click of the mouse while pointing to the edge of a page, may cause a second carousel to appear 215 in FIG. 2. For example, the initial page may relate to shoes in a catalog. The second carousel may contain pictures of all available shoes. Drawing the image of the second carousel on the graphics display is accomplished in the same manner as the drawing of the first (see FIGS. 3 and 4 descriptions). The carousel software maintains data structures, for example loaded from files on disks, which specify the information identifying the new pages to be displayed.

Given this disclosure, one skilled in the art can come up with alternative equivalent embodiments for this invention that are within the contemplation of the inventors.

We claim:

1. An apparatus for showing a plurality of video displays comprising:
   a. a graphical interface capable of rendering a three dimensional perspective of an object;
   b. a plurality of video displays set in a carrousel rendered on said graphical interface, each display presented on a page within the carrousel, each page having a page boundary, and the boundary of the page having an axial edge facing the center of the carrousel with the page extending radially outward from the axial edge; and
   c. an axis at the center of the carrousel to which the axial edge of each page is attached so that the video display on a subset of one or more of the pages are fully visible for viewing within the carrousel on the interface while the remainder of the video displays are not.

2. An apparatus, as in claim 1, which further comprises controls for the graphical interface for rotating the pages around their axial edges in one or more directions around said axis so that the one or more pages making up the subset of pages containing the fully visible display within said carrousel changes with the rotation.

3. An apparatus, as in claim 2 including a mouse with the controls driven by a mouse cursor operated by the mouse.

4. An apparatus, as in claim 2, where said controls include selecting means for choosing a page in the subset with said controls.

5. An apparatus, as in claim 4, where a selected page is brought out of the carousel to another area on the graphical interface or from another area of the graphical interface onto the carrousel by said selection means.

6. An apparatus, as in claim 4, where said controls initiate a function represented by a video display on the selected page.

7. An apparatus, as in claim 4, where the selection means includes a mouse.

8. An apparatus, as in claim 2, where one or more of said video displays on said pages is an icon.

9. An apparatus, as in claim 8, where said controls include means for one or more of the icons to be selected and the selected icon produces an image of a second carrousel.

10. An apparatus, as in claim 2, where the video display on one or more of the pages is dynamic video information.

11. An apparatus, as in claim 10, where said controls include means for obtaining the dynamic video information from a television channel.

12. An apparatus, as in claim 11, where the dynamic video information is a multimedia object.

13. An apparatus, as in claim 8, including an audio output selectable for the icon.

14. An apparatus, as in claim 11, including an audio output selected for one or more of the displays with dynamic video information.

15. An apparatus, as in claim 2, where the number of pages is indicated on the graphical interface.

16. An apparatus, as in claim 2, wherein said controls include moving means for moving pages in and out of said carrousel.

17. An apparatus, as in claim 16, wherein said controls include spacing means for adjusting the angular spacing between the pages in the carrousel as the number of pages in the carrousel changes.

18. A method for arranging images of selectable items on a display screen of a system and selecting the images for operation of the represented items on the system comprising the steps of:
   a. representing each of the selectable items as a separate representative image on a page;
   b. arranging the pages into a three dimensional icon with one edge of the pages attached to a common axis in the middle of the icon and the pages with only a subset of one or more of the images viewable at a given time;
   c. rotating the pages around the axis within the icon to change the subset of pages containing the viewable images; and
   d. choosing an item for operation on the system by selecting an image representing that item from the viewable subset.

19. The method of claim 18 wherein the selection of an image in step d. includes moving the page containing the selected image out of the three dimensional icon into another area of the display screen.

20. The method of claim 19 wherein the selection of an image in step d. includes establishing, from the page containing the selected image, another representation of a three dimensional icon with multiple pages each with a representative image within the interior of said another three dimensional icon.

* * * * *